US005512707A

United States Patent [19]

Ohshima

[11] Patent Number: 5,512,707
[45] Date of Patent: Apr. 30, 1996

[54] CONTROL PANEL HAVING A GRAPHICAL USER INTERFACE FOR SETTING CONTROL PANEL DATA WITH STYLUS

[75] Inventor: Osamu Ohshima, Hamamatsu, Japan

[73] Assignee: Yamaha Corporation, Japan

[21] Appl. No.: 177,230

[22] Filed: Jan. 4, 1994

[30] Foreign Application Priority Data

Jan. 6, 1993  [JP]  Japan .................................. 5-000738

[51] Int. Cl.[6] ...................................................... G01P 3/00
[52] U.S. Cl. ...................................... 84/658; 84/743
[58] Field of Search ............................. 84/600, 644, 645, 84/658, 670, 671, 743

[56] References Cited

U.S. PATENT DOCUMENTS

| | | | |
|---|---|---|---|
| 5,220,117 | 6/1993 | Yamada et al. | 84/600 |
| 5,247,131 | 9/1993 | Okamoto et al. | 84/658 |
| 5,265,516 | 11/1993 | Usa et al. | 84/600 |
| 5,276,272 | 1/1994 | Masuda | 84/600 |
| 5,288,938 | 2/1994 | Wheaton | 84/600 |

FOREIGN PATENT DOCUMENTS 64-53222   3/1989   Japan .

*Primary Examiner*—William M. Shoop, Jr.
*Assistant Examiner*—Jeffrey W. Donels
*Attorney, Agent, or Firm*—Graham & James

[57] ABSTRACT

A panel device is installed in a machine for setting a numerical data in a desired updating mode to input the same into the machine. The panel device has a display panel for displaying a plurality of numerical data. A pointing tool is manually handled to touch the display panel for designating a requested one of the numerical data to be set, and is moved for drawing a gesture pattern. A fiat sensor is coupled to the pointing tool for detecting the drawn gesture pattern. An analyzer analyzes the detected gesture pattern to determine a particular updating mode associated to the gesture pattern. A processor carries out setting of the designated numerical data according to the determined updating mode.

12 Claims, 4 Drawing Sheets

FIG.3
(1)
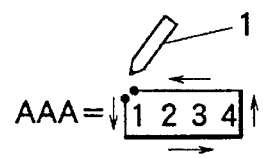
(2) (3)
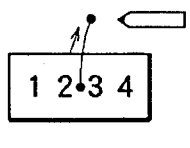 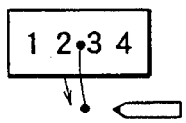
(4) (5)
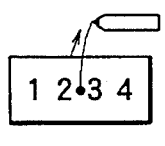 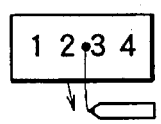
(6) (7)
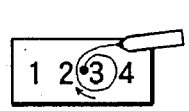 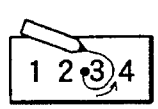
(8) (9)
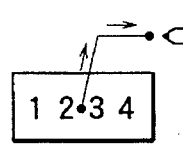 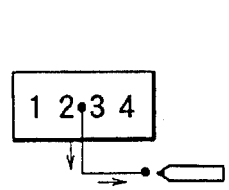
(10)
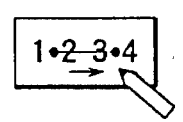

CONTROL PANEL HAVING A GRAPHICAL USER INTERFACE FOR SETTING CONTROL PANEL DATA WITH STYLUS

BACKGROUND OF THE INVENTION

The present invention relates to a control panel device installed in an electronic machine such as an electronic musical instrument for setting a numerical data which is inputted to control performance of the electronic musical instrument.

Recently, a multiple of control parameters are provided for controlling an advanced type of the electronic musical instrument having expanded performance functions. Such an electronic musical instrument is installed with a control panel device utilizing a graphic user interface (GUI) to facilitate selecting and setting of the control parameters. Specifically, the electronic musical instrument admits numerical parameters or numerical data applied to a tone generator and else so as to control a tone volume, an acoustic effect, an envelope waveform and so on. Generally, an absolute value of the numerical data does not have significant meanings, but a relative variation of the numerical data is effective to control the performance. Usually, the setting of the numerical data is carried out by relative shifting from an old value to a desired new value, or by returning to a particular standard or default value.

However, the conventional control panel device of the electronic musical instrument regularly utilizes a digit input piece such as a ten-key, which is suitable for setting an absolute value of a selected numerical data, but is rather inconvenient for continuously or incrementally changing the numerical data as noted above. The control panel device may include other operating pieces such as a slider piece and a rotary piece, which can be used to carry out the relative changing of the numerical value. However, an operating range thereof is physically limited by the mechanical structure to thereby obviate extensive variation of the numerical data. Consequently, the conventional electronic musical instrument is provided with rather redundant operating pieces for covering various setting modes of different parameters. Thus, the setting operation is rather complicated, and the control panel device is not reduced in size. Further, the operating pieces are located remotely from a display panel which indicates the parameters to be set. The operator must shift his eyes between the operating piece and the display panel during the setting of the numerical value in troublesome manner.

SUMMARY OF THE INVENTION

In view of the above noted drawbacks of the prior art, an object of the invention is to facilitate setting numerical data in a control panel device installed in an electronic machine such as an electronic musical instrument, and to realize compact installation of the control panel device in the electronic machine. According to the invention, a panel device is installed in a machine for setting a numerical data in a desired updating mode to input the same into the machine. The panel device comprises display means for displaying a plurality of numerical data, pointing means manually handled to touch the display means for designating a requested one of the numerical data to be set, and being moved for drawing a gesture pattern, detecting means coupled to the pointing means for detecting the drawn gesture pattern, analyzing means for analyzing the detected gesture pattern to determine a particular updating mode associated to the gesture pattern, and operation means for carrying out setting of the designated numerical data according to the determined updating mode.

In operation, the pointing means such as a wireless stylus pen is placed on the display means such as a liquid crystal display panel for designating a desired one of the numerical data indicated in the display panel. Further, the stylus pen is moved to draw a gesture pattern. Concurrently, the detecting means such as a flat sensor coupled to the stylus pen detects the gesture pattern in terms of a moving direction, a moving velocity and an exerted pressure of the stylus pen. The analyzing means recognizes the detected gesture pattern to determine a particular updating mode associated to the gesture pattern. Lastly, the designated numerical data is altered by the particular updating mode such as a single step increment mode, a continuous increment mode, a quick reset mode and so on, which are associated to different gesture patterns.

BRIEF DESCRIPTION OF THE DRAWINGS

FIG. 3 is an illustrative diagram showing various updating modes of the FIG. 1 embodiment.

DETAILED DESCRIPTION OF THE INVENTION

Figure 1:
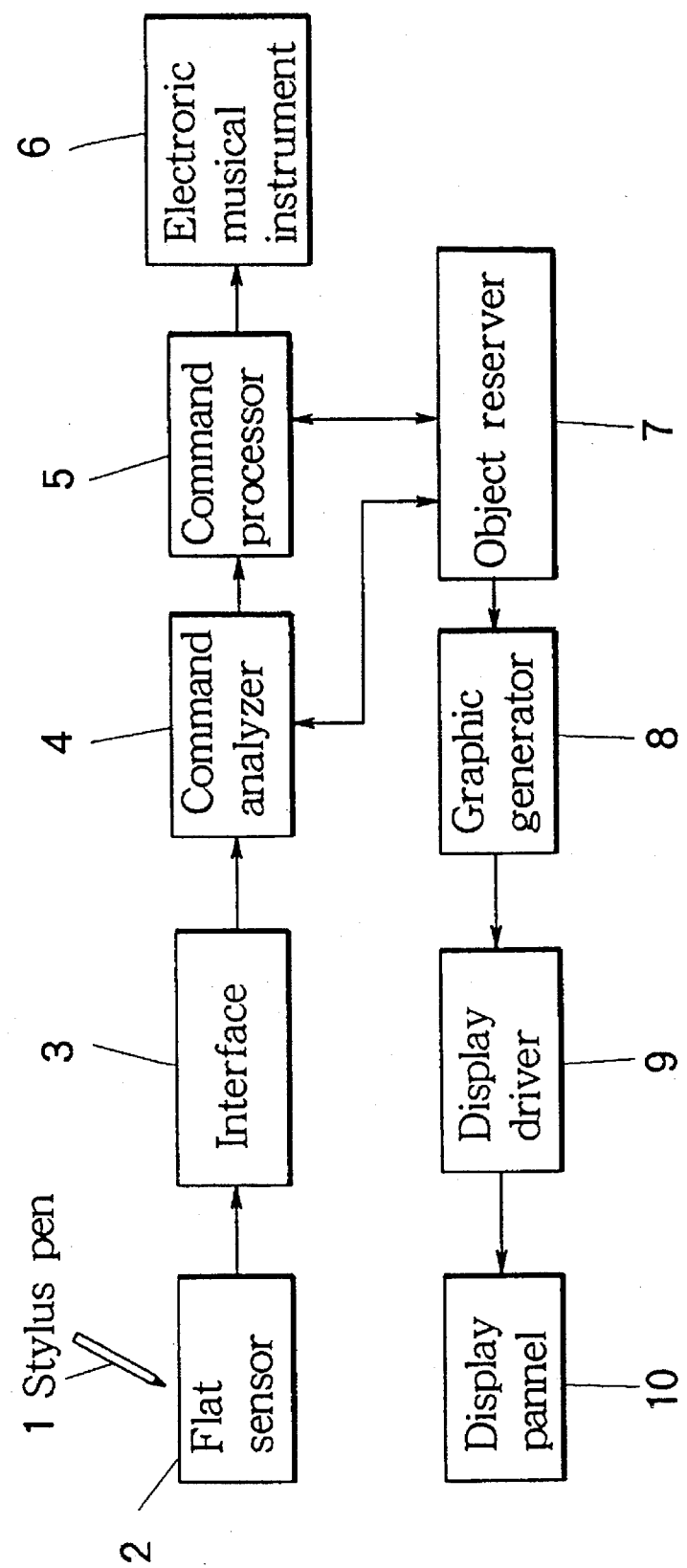
FIG. 1 is a block diagram showing one embodiment of the inventive control panel device installed in an electronic musical instrument.

Hereinafter, one embodiment of the invention will be described in conjunction with the drawings. FIG. 1 shows a hardware construction of the inventive panel device. In the figure, the device includes an electronic pointing tool such as a stylus pen 1 of a wireless type. The stylus pen 1 has a coil and a core inside thereof. The stylus pen 1 is manipulated to touch a top face of a display panel 10 to point to a desired numerical data indicated on the display panel 10. Further, the stylus pen 1 can be handled to carry out selecting and setting various active windows provided as a graphic user interface in the display panel 10. An electronic tablet such as a flat sensor 2 is integrated in contact with a bottom face of the display panel 10 which may be composed of a liquid crystal flat panel. The flat sensor 2 is magnetically coupled to the stylus pen 1 such that a localized electromagnetic resonance is induced therebetween when the stylus pen 1 is placed in contact with the top face of the display panel 10. Consequently, the flat sensor 2 detects a position designated by the stylus pen 1 and a touch pressure exerted by the stylus pen 1 according to the induced electromagnetic resonance. The flat sensor 2 feeds a corresponding detection signal to a command analyzer 4 through an interface 3. Such a tablet system is disclosed, for example, in Japanese patent application Laid-open No. 64-53222 (1989).

The display panel 10 is controlled to selectively display a multiple of windows, which may contain icons, characters and numerals. Therefore, the device reserves hidden objects other than those presented in an active window currently opened on the display panel 10. The object refers to all the graphic components such as window, icon, character and numeral. The object reserver 7 reserves all the object data including hidden ones. The object reserver 7 selectively outputs a requested object data associated with the currently active window, to a subsequent graphic generator 8. Then, the object data is visually reproduced on the display panel 10 by means of a display driver 9 containing VRAM. The upper display panel 10 and the lower flat sensor 2 are superposed with each other: however, a parallax may cause a sight error between a viewed position pointed by the stylus pen on the upper display panel 10 and an actually detected position in the lower flat sensor 2. In view of this, the detected position is indicated by a cursor mark on the display panel 10 so as to assist in accurate pointing operation by the stylus pen 1.

The command analyzer 4 operates according to the detection signal fed from the interface 3 for analyzing touch and stroke movements of the stylus pen 1. Further, the command analyzer 4 determines a specific operation command based on the analyzed results. Moreover, the command analyzer 4 is connected to the data reserver 7 to designate object data according to the pointing operation of the stylus pen 1 for processing the designated object data.

A command processor 5 receives the operation command issued by the command analyzer 4 so as to execute various tasks according to the operation command, such as numerical updating of the designated object data and selecting/ setting of the object windows. The updated numerical object data is inputted into an electronic musical instrument 6 as a control parameter effective to control musical performance. The updated numerical object data is also fed back to the object reserver 7. By such an operation, a desired performance can be carried out in the electronic musical instrument 6 according to the update control parameter. Meanwhile, the updated numerical value of the designated object data is indicated on the display panel 10. The display panel 10 may be mounted on a body of the electronic musical instrument 6.

Figure 2:
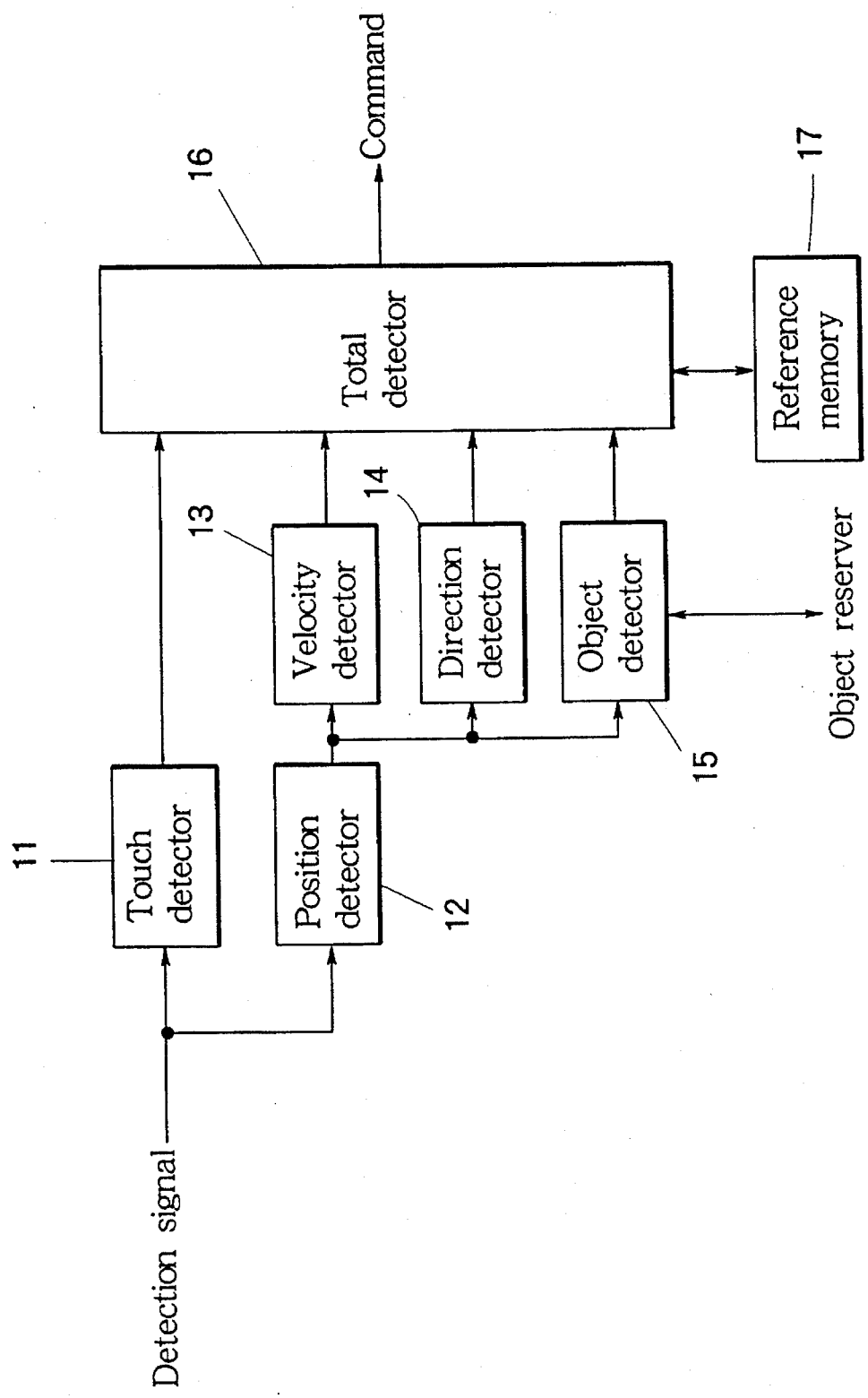
FIG. 2 is a block diagram showing an internal construction of a command analyzer provided in the control panel device of FIG. 1.

FIG. 2 is a detailed block diagram showing an internal construction of the command analyzer 4. In the figure, the command analyzer 4 has a touch detector 11 and a position detector 12, which receive the detection signal from the interface 3. The touch detector 11 detects an up or down state of the stylus pen 1 according to a magnitude of the detected touch pressure exerted by the stylus pen 1 with reference to a given threshold value. The detected result is fed to a total detector 16.

On the other hand, the position detector 12 successively detects a position of the stylus pen 1, where the localized resonance is induced between the stylus pen 1 and the flat sensor 2. The detected result is successively distributed to those of a velocity detector 13, a direction detector 14 and an object detector 15. The velocity detector 13 differentially processes the time-sequentially sampled position data to detect a moving velocity of the stylus pen 1 during the course of a sequence of the stroke operation thereof. The detected velocity data is fed to the total detector 16. Further, the direction detector detects a moving direction of the stylus pen 1 according to a relative shift from the previous position to the present position. The detected direction data is also fed to the total detector 16. Moreover, the object detector 15 discriminates a pointed object represented on the display panel 10 according to the detected pen position while accessing the object reserver 7. Namely, if the stylus pen 1 is placed in registration with a displayed numerical data, such is discriminated as the object to be set. Accordingly, it is judged that setting of the discriminated numerical data is requested. On the other hand, if the stylus pen 1 is placed within a displayed window, but away from any numerical data involved in the window, it is judged that the window itself is the pointed object and consequently a certain action is requested for the displayed window. The discriminated object data is fed to the total detector 16. The object detector 15 notifies the object reserver 7 of the object data to be updated.

The total detector 16 receives those of the touch data, velocity data and direction data, which represent the stroke motion of the stylus pen called "gesture pattern". The total detector 16 compares the gesture pattern with reference patterns provisionally stored in a reference memory 17 so as to determine the operation command, which is fed to the command processor 5.

Figure 4:
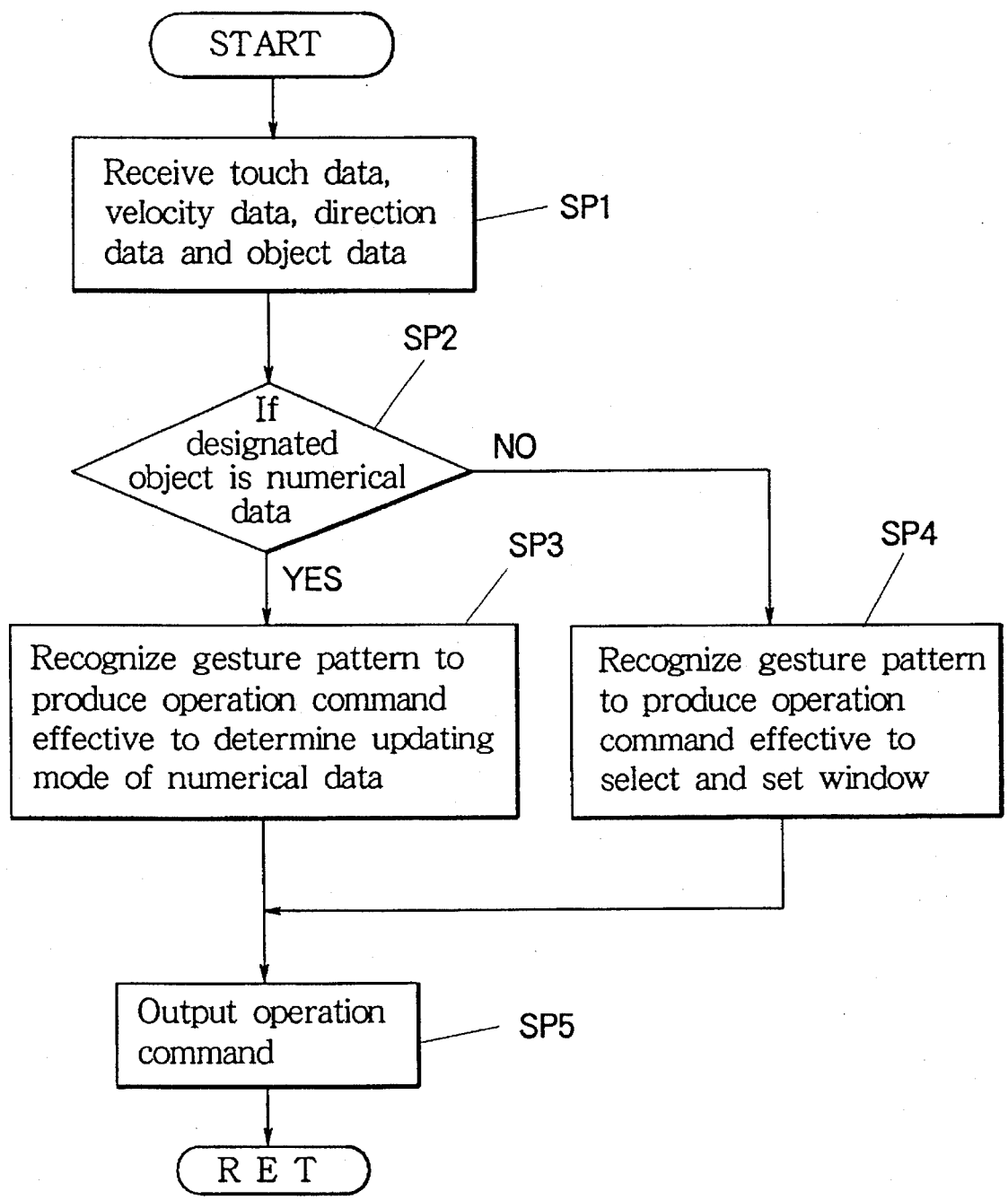
FIG. 4 is a flowchart showing operation of a total detector provided in the command analyzer of FIG. 2.

FIG. 4 is a flowchart showing the process of the command determination repeatedly carried out in the total detector 16. After the device is started, first Step SP1 is undertaken such that the total detector 16 receives detected results including the touch data, the velocity data, the direction data and the object data. Next, Step SP2 is undertaken to check as to if the object data indicates a numerical data.

To facilitate the better understanding of the operation, a practical example is demonstrated with reference to FIG. 3. In the exemplified operation, the stylus pen 1 is manipulated to designate one of numerical data for use in control of the electronic musical instrument 6, and the designated numerical data is set in a desired updating mode according to a stroke manner of the stylus pen. At first in Operation (1), the stylus pen 1 is handled to encircle a desired numerical data "1234" indicated on the display panel 10. By this motion, the numerical data "1234" is designated as a target.

Referring back to the FIG. 4 flowchart, when the numerical data is designated for the target as exemplified above, the check result of Step SP2 is found YES to thereby proceed to Step SP3. In this step, the gesture pattern drawn by the stylus pen 1 and represented by those touch, velocity and direction data is interpreted as the operation command for setting the designated numerical data by a specific updating mode. Matching operation is conducted between the detected gesture pattern of the pen motion and the reference patterns stored in the reference memory 17 to determine the specific updating mode.

Referring again to FIG. 3, Operations (2)–(10) exemplify various gesture patterns of the stylus pen 1 applied to the target numerical data "1234". Hereinafter, each operation will be described in terms of the gesture pattern and the corresponding updating mode, where practical association exists between the gesture pattern and the updating mode.

Operation (2): initially the stylus pen is placed in contact with this display face with a certain pressure, then drawn upward while keeping the pressure, and immediately thereafter removed away while releasing the pressure. This stroke gesture commands single step increment such that the original data "1234" is updated to "1235".

Operation (3): Initially the stylus pen is placed in contact with the display face with a certain pressure, then drawn downward while keeping the pressure, and immediately thereafter removed away while releasing the pressure. This stroke gesture commands single step decrement such that the displayed data "1234" is updated to "1233".

Operation (4): Initially the stylus pen is placed in contact with the display face with a certain pressure, then drawn upward while keeping the pressure, and thereafter held stationarily while maintaining the pressure. This gesture commands continuous increment until the pressure is released such that the displayed data "1234" is continuously incremented to "1235", "1236", . . .

Operation (5): Initially the stylus pen is placed in contact with the display face with a certain pressure, then drawn downward while keeping the pressure, and thereafter held stationarily while maintaining the pressure. This gesture commands continuous decrement until the pressure is released such that the displayed data "1234" is continuously decreased to "1233", "1232", . . .

Operation (6): The stylus pen is depressed on the display face, and then moved clockwise to draw a spiral at a desired velocity. This gesture commands continuous increment proportionally to the drawing velocity.

Operation (7): The stylus pen is depressed onto the display face, and then moved counterclockwise to draw a spiral at a desired velocity. This gesture commands continuous decrement proportionally to the drawing velocity.

Operation (8): Initially the stylus pen is depressed onto the display face, then drawn upward, subsequently turned rightward while maintaining the pressure, and thereafter removed away. This gesture commands instant reset to a given maximum value such that the circuit value "1234" is reset, for example, to the upper limit value "9999".

Operation (9): Initially the stylus pen is depressed onto the display face, then drawn downward, subsequently turned rightward while maintaining the pressure, and thereafter removed away. This gesture commands instant, reset to a given minimum value such that the current value "1234" is instantly reset, to, for example, the lower limit value "0001".

Operation (10): Initially the stylus pen is depressed onto the display face, then drawn right, ward, and thereafter removed away. This gesture commands instant reset to a given default value such that the current value "1234" is returned to, for example, a given default value "5000".

Referring back again to FIG. 4, if the check result of Step SP2 is found NO, Step SP4 is undertaken where judgement is made that the target is directed to the window operation. The detected gesture is interpreted with reference to the reference memory 17 to determine a corresponding command such as selection of a new window, change of a window size or other command. Lastly, the determined operation command is outputted in Step SP5. The operation command is transmitted to the command processor 5 to execute a requested operation as specified by the command.

The inventive control panel device is not limited to the disclosed embodiment, but may include various modifications. For example, the processing in the command analyzer 4 and else can be achieved by a software of a computer. Further, the stylus pen is replaced by another input tool such as a mouse so as to input a gesture pattern. In addition to the updating of the numerical data by the gesture command, the stylus pen may be handled to draw a numerical character which is directly recognized to input a numerical value. In such a case, the flat sensor may be provided with a working area exclusively used for the character recognition purpose to ensure correct reading of the inputted character.

As described above, according to the invention, the pointing tool such as the wireless stylus pen is handled to exercise a rather simple gesture to input an associative command for updating a numerical data, thereby facilitating parameter setting in an electronic musical instrument or else, and achieving efficient use of a space over the display panel installed in the electronic musical instrument.

What is claimed is:

1. A panel device installed in a machine for setting numerical data in a desired updating mode into the machine, the panel device comprising:

display means for displaying at least one numerical data item;

pointing means manually handled to touch the display means for designating a requested one of the numerical data to be updated, and being moved for drawing a gesture pattern;

detecting means coupled to the pointing means for detecting the drawn gesture pattern;

analyzing means for analyzing the detected gesture pattern to determine a particular updating mode associated to the gesture pattern; and operation means for carrying out updating of the designated numerical data according to the determined updating mode.

2. A panel device according to claim 1, being installed in a machine constituting an electronic musical instrument for setting numerical data which is inputted into the electronic musical instrument to control a performance thereof.

3. A panel device according to claim 1, wherein the pointing means comprises a stylus pen which may be used to draw a gesture pattern, and the detecting means includes a flat sensor disposed under the display means and being coupled to the stylus pen across the display means for sensing the drawn gesture pattern.

4. A panel device according to claim 1, wherein the detecting means comprises means for detecting the drawn gesture pattern in terms of a moving velocity, a moving direction and an exerted pressure of the pointing means.

5. A panel device according to claim 1, wherein the analyzing means includes means for recognizing the gesture pattern by a matching method using preset reference patterns.

6. A panel device according to claim 1, wherein the analyzing means includes means for determining a particular updating mode for updating the displayed numerical data item selected from a single step increment mode, a single step decrement mode, a continuous increment mode, a continuous decrement mode and an instant reset mode, each of which are associated with different gesture patterns.

7. A panel device installed in a machine for setting numerical data in a desired updating mode, the panel device comprising:

display means for displaying at least one numerical data item;

pointing means for designating the numerical data item to be updated, and being moved along the display means over the designated numerical data item for drawing a gesture pattern;

detecting means coupled to the pointing means for detecting the drawn gesture pattern;

analyzing means for analyzing the detected gesture pattern to determine a particular updating mode associated with the gesture pattern; and operation means updating the designated numerical data item according to the determined updating mode.

8. A panel device according to claim 7, being installed in a machine constituting an electronic musical instrument for setting a numerical data item which is inputted into the electronic musical instrument to control performance thereof.

9. A panel device according to claim 7, wherein the pointing means comprises a stylus pen which may be used to draw a gesture pattern, and the detecting means includes a flat sensor disposed under the display means and being coupled to the stylus pen across the display means for sensing the drawn gesture pattern.

10. A panel device according to claim 7, wherein the detecting means comprises means for detecting the drawn gesture pattern in terms of moving velocity, a moving direction and an exerted pressure of the pointing means.

11. A panel device according to claim 7, wherein the analyzing means includes means for recognizing the gesture pattern by a matching method using preset reference patterns.

12. A panel device according to claim 7, wherein the analyzing means includes means for determining a particular updating mode for updating the displayed numerical data item selected from a single step increment mode, a single step decrement mode, a continuous increment mode, a continuous decrement mode and an instant reset mode, each of which are associated with different gesture patterns.

* * * * *